United States Patent
Barnett

(10) Patent No.: US 8,494,121 B1
(45) Date of Patent: Jul. 23, 2013

(54) SYSTEM AND METHOD FOR GATHERING INFORMATION AT A CRISIS SCENE

(76) Inventor: Edwin C. Barnett, Naperville, IL (US)

( * ) Notice: Subject to any disclaimer, the term of this patent is extended or adjusted under 35 U.S.C. 154(b) by 284 days.

(21) Appl. No.: 13/033,143

(22) Filed: Feb. 23, 2011

Related U.S. Application Data

(60) Provisional application No. 61/311,426, filed on Mar. 8, 2010.

(51) Int. Cl.
*H04M 11/00* (2006.01)

(52) U.S. Cl.
USPC .................................. 379/37; 379/45; 379/50

(58) Field of Classification Search
USPC ................... 379/37–49; 705/3, 301, 9
See application file for complete search history.

(56) References Cited

U.S. PATENT DOCUMENTS

| | | | |
|---|---|---|---|
| 5,185,697 A | 2/1993 | Jacobs et al. | |
| 7,106,835 B2 * | 9/2006 | Saalsaa | 379/45 |
| 7,134,088 B2 | 11/2006 | Larson | |
| 2002/0029205 A1 * | 3/2002 | Pedraza et al. | 706/21 |
| 2005/0091368 A1 | 4/2005 | Ozburn | |
| 2006/0259586 A1 * | 11/2006 | Wood et al. | 709/219 |
| 2007/0096894 A1 | 5/2007 | Lemmon | |
| 2007/0116189 A1 * | 5/2007 | Clawson | 379/37 |
| 2009/0284348 A1 * | 11/2009 | Pfeffer | 340/7.3 |
| 2009/0296898 A1 * | 12/2009 | Ragno et al. | 379/45 |
| 2010/0174560 A1 * | 7/2010 | Quan et al. | 705/3 |

* cited by examiner

*Primary Examiner* — Melur Ramakrishnaiah
(74) *Attorney, Agent, or Firm* — Clifford Kraft

(57) ABSTRACT

A system and method for rapidly gathering information at an emergency scene from people located inside the emergency using a telephone call system capable of simultaneously receiving a large number of calls to the same telephone number. People in rooms can be trained to call a posted emergency number. Automatic questions concerning location and situation near the caller can be asked and the responses combined and processed to present a spreadsheet or other presentation to responders so that they have a maximum of information known to those inside the emergency. Questions can be tailored for fire, armed attack and other emergencies. The results can be presented wirelessly to responders either over official communication channels or by means of a secure website. Each call can be time stamped and an ID can be established allowing callback by responders for more information or to give instructions to particular individuals or groups.

20 Claims, 8 Drawing Sheets

1. ROOM NUMBER CALLING FROM?

2. NUMBER OF PEOPLE IN THE ROOM?

3. NUMBER OF INJURIES IN THE ROOM?

4. ANY FATALITIES IN THE ROOM?

5. ANY KNOWLEDGE OF OFFENDERS?

6. DANGER LEVEL 1-10?

7. LAST FOUR DIGITS OF SS.

FIG. 4

| Date: 9 Sept. 2007 | | | | | | KNOWLEDGE OF OFFENDERS | | |
|---|---|---|---|---|---|---|---|---|
| ROOM # | TIME | # PEOPLE IN ROOM | # INJURED | FATALITIES | CONTACT NUMBER | | DANGER LEVEL | COMMENTS |
| 1 | 0901 | 6 | 2 | NO | 312 2733-4717 | YES | 9 | |
| 2 | 0903 | 25 | 1 | YES | 847 229-3991 | NO | 10 | |
| 3 | 0849 | 20 | 0 | NO | 312 212-3399 | NO | 2 | |
| 4 | 0852 | 26 | 0 | NO | 312 422-9979 | NO | 5 | |
| 5 | 0853 | 13 | 0 | NO | 847 211-9923 | NO | 4 | |
| 6 | 0905 | 12 | 0 | NO | 847 211-5555 | NO | 3 | |
| 7 | 0910 | 13 | 0 | NO | 630 225-9917 | NO | 3 | |
| 8 | 0843 | 10 | 0 | NO | 312 422-9947 | YES | 9 | |
| 9 | — | | 0 | | | | | NO CONTACT |
| 10 | 0845 | 30 | 0 | NO | 312 244-6533 | NO | 2 | |
| 11 | 0844 | 18 | 0 | NO | 630 455-2291 | NO | 2 | |
| 12 | 0903 | 4 | 1 | NO | 847 333-9911 | NO | 2 | NOT RELIABLE |
| Lounge | 0849 | 2 | 0 | NO | 312 444-5512 | NO | 3 | |

FIG. 5

SYSTEM AND METHOD FOR GATHERING INFORMATION AT A CRISIS SCENE

This application is related to, and claims priority from, U.S. Provisional Patent Application No. 61/311,426 file Mar. 8, 2010. Application 61/311,426 is hereby incorporated by reference.

BACKGROUND

1. Field of the Invention

The present invention relates generally to the field of emergency response and more particularly to a system and method for gathering information at a crisis scene.

2. Description of the Prior Art

Events occur frequently that require emergency response by trained responders. In particular, shooting and hostage taking crises unfortunately occur with regularity. A particularly striking example is the shooting at Columbine High School in Littleton Colo. in April 1999. Here, two young shooters entered the cafeteria and other rooms of the school with semi-automatic weapons and sawed-off shotguns killing indiscriminately. Numerous other shootings in high schools, colleges, fast food restaurants, places of employment and the like occur with regularity. Some examples are the shootings at Virginia Tech and Northern Illinois University. A particularly recent example is the organized attacks on a hotel and other locations in Mumbai India and two recent school attacks in Germany as well as a gunman attack on a United States Congress Woman in Arizona.

Responders usually are dispatched in response to numerous 911 calls from various people in proximity to the scene. In many cases the callers are excited and do not provide complete or possibly even rational information. Police usually arrive at the scene first. Other responders such as fire, FBI or SWAT teams arrive next. Many times, the police have the scene locked down by then, and there may be a large number of people still in rooms such as classrooms or hotel rooms, and there may be injured victims or fatalities in rooms. Dozens to even hundreds of responders may be present within a short time. The major problem is that, in these first critical moments, nobody really has any reliable information about what exactly happened, how many people are locked inside, how many injured there are, how many fatalities there are, who needs help, how dangerous the situation is, and most important, where the perpetrator or perpetrators are. In addition, there may be an over-abundance of conflicting reports adding to the chaos. To make matters worse, there may be people locked down in rooms with important information and no real way to communicate what they know to the responders. Such lack of intelligence regarding the crisis scene prevents a quick and effective response to neutralize the threat, aid the victims, and bring the situation to an end in an expeditious manner.

Fires, especially fires in large or high-rise buildings or hotels present a similar situation. In this case police and firefighters arrive at the scene possibly not knowing exactly where the fire is in the building or how many people are in rooms or where these people are. Also, they have no way to give instructions to people in the building.

It would be advantageous to have a system and method for getting information at a crisis scene from people who at least partially know what is going on, namely those people inside the scene such as students locked down in classrooms or hotel guests locked down in hotel rooms.

Jacobs et al. in U.S. Pat. No. 5,185,697 teach management in a crisis situation by obtaining information from responders in various positions such as remote units, snipers, etc. Information is compiled into a topic file with time tags. Importantly, Jacobs et al. fail to solve the problem of obtaining information from victims inside the scene.

Ozburn in U.S. published patent application number 2005/0091368 teaches an interactive crisis management system that allows persons needing to be alerted to be automatically alerted by computer. Again, there is no way to get inside information on exactly what is happening.

Lemmon in U.S. published application 2007/0096894 provides event communication keeping all people needing information at a crisis scene up to date on developments.

Larson in U.S. Pat. No. 7,134,088 teaches a computer-based method and system for storing and retrieving tactical information at a crisis scene such as maps, building diagrams and the like. While these are ultimately very useful to responders, they are of no real use early in the situation until some sort of analysis has been made, and plans are being made to solve the problem.

In summary, the prior art does not teach or suggest a way to easily get information from those inside the scene to responders in a reliable and orderly way so that it can be analyzed, compared and used.

SUMMARY OF THE INVENTION

The present invention makes use of telephone systems, and other communication systems, known in the art that can receive and process hundreds of calls simultaneously without blocking incoming calls. These systems can be PBX-like equipment (such as a parallel PBX) that are designed to handle many calls to the same telephone number occurring at almost the same time or over a small time window. These systems are generally used in advertising and sales situations such as infomercials or TV ads that flash a particular number on the screen resulting in immediate dialing by numerous parties and in other sales and advertising situations where numerous calls will be made to the same number.

According to the present invention, a particular facility such as a school, hotel, plant, warehouse or other location can be assigned a particular emergency telephone number that can be posted in each room or space of importance. In a crisis, one person in each room can call the particular posted telephone number. That person then receives a series of recorded questions which can be answered either by voice recognition or by keypad or screen entry. This list of questions can include the room number calling from, the number of people in the room, the number of injuries in the room, any fatalities in the room, any knowledge of the offenders, fire or the situation, and an estimated danger level, say 1-10 as well as other possible questions. The system can automatically date/time stamp each call and affix the caller ID so that the person can be called back if more information is needed. In the case of a school, students can be trained, and even drilled, to call this number in the appropriate emergency. At other locations such as plants or warehouses, employees can be trained to have one or more designated persons in a particular area make the call.

The totality of the information collected can be presented to responders as a spreadsheet, on a computer screen, projected on a screen, or in any other way appropriate to the situation. The key is to get the information up quickly so that it can be used. Using the present invention, responders can quickly, without having to request information, develop an overall assessment of the extent and nature of the crisis, identify the number of victims and locate where they are, identify the number of hostiles and potential intelligence regarding their description, weapons, and in some cases, their whereabouts, develop communication with victims, manage the scene, and finally, develop a plan to resolve the crisis.

The intelligence and knowledge obtained by communicating with independent sets of victims in multiple rooms located in crisis sites enables responders to respond in an effective and expeditious manner without the confusion normally associated with such a crisis scene.

The information can also be collected, processed and made available on a secure webpage on the Internet (or over any other type of data network). This way, commanders and other authorized people remote from the scene can also immediately access the information.

Since most people nowadays carry cellular telephones, this information can be instantly available. However, it is only useful if it can be communicated and presented to responders. As stated, teachers, students, administrators, officers, guards and other occupants of buildings can be easily trained and orientated as to how and when to use this telephone number. In the case of a middle or high school, one or more particular students can be named as room monitors whose job it would be to make such a call. In other less rigid locations such as hotel rooms, university classrooms and the like, the number can simply be posted along with instructions printed in a visible manner.

It is thus an object of the present invention to provide a way that people with the most knowledge about a particular crisis, namely those inside, can efficiently and quickly transfer that knowledge to responders.

It is a further object of the present invention to provide responders with the information so-received in a readable, location directed, or chronological format early in the crisis when intelligence about the situation is most needed.

It is finally an object of the present invention to provide a tool that will allow responders to communicate with independent sets of victims in multiple rooms in crisis sites allowing responders to respond in an efficient, effective and expeditious manner without undue confusion.

DESCRIPTION OF THE FIGURES

Attention is now called to several illustrations that show various features of the present invention:

FIG. 4 is an example of a list of automatic questions.

FIG. 5 shows a spreadsheet display that can be generated automatically or manually listing the responses in location order.

Several drawings and illustrations have been presented to aid in understanding the present invention. The scope of the present invention is not limited to what is shown in the figures.

DETAILED DESCRIPTION OF THE INVENTION

The present invention relates to a system and method for quickly gathering important situation information from people inside a crisis scene and presenting it in a format where responders can immediately use it to access the situation and formulate plans to bring it to a conclusion. Existing telephone communication technology designed to receive a large number of simultaneous calls to the same number can be configured to automatically ask a series of static or interactive questions to the caller to gather the desired information. Responses can be made by voice using voice recognition, by keypad or by touch screen. The system then can present the information as it comes in to responders in location, chronological or other useful order. The result can be presented as a simple spreadsheet, or it can optionally be presented in ways where it can be arranged other than chronological. For example, the responders may want just a list of rooms with injured victims. The system could list these rooms only or mark them on a graphical display, say in color. In other examples, the responders might want all available data displayed In some embodiments of the present invention, the system could also mark locations where the perpetrators were and times they were there (assuming this information is available). Each returned response generally contains the calling telephone number and other identifying information so that responders can call particular numbers for more information if desired.

The present invention can provide:
1) almost immediate intelligence for law enforcement authorities responding to a crisis where loss of life or injury has or will possibly occur;
2) a path of possible immediate communication with victims inside a crisis;
3) intelligence necessary to rescue injured victims in the most expeditious time frame or to provide medical treatment instruction to those injured who cannot be reached;
4) information necessary for law enforcement to develop a response plan for resolving the crisis in a timely manner reducing the threat of additional or potential injuries or deaths;
5) possible communication with the perpetrator(s) in some situations;
6) the ability to direct victim actions.

Figure 1:
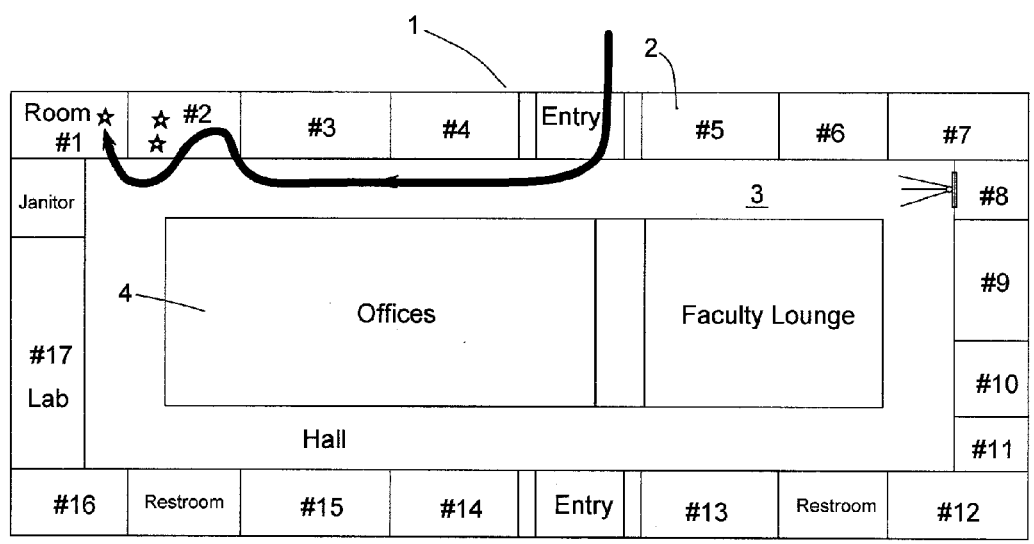
FIG. 1 shows a floor diagram of a possible crisis scene like a school.

FIG. 1 shows a diagram of a crisis site such as a school, university, office building, plant or other building. A building 1 has a hall 3 can be seen with a number of rooms 2 surrounding it. A central area 4 contains offices and a faculty lounge. A lone shooter has entered through an entry and has first entered Room #1 shooting two occupants who are injured, but not dead. The shooter has then exited Room #1 and entered Room #2 killing one person. An observer in Room #8 looking through a glass door saw the shooter exit room #2 after firing shots and entering room #1.

Occupants from several of the rooms immediately dial the special emergency number posted in the rooms. Upon answering the automatically generated questions, all of the information recited above immediately ends up on a spreadsheet, whiteboard or display screen for responders to use. In addition, the responders have telephone numbers of strategically located people within the scene who can continue to report if necessary. The questions, at a minimum, can include location and situation near the caller questions.

Figure 2:
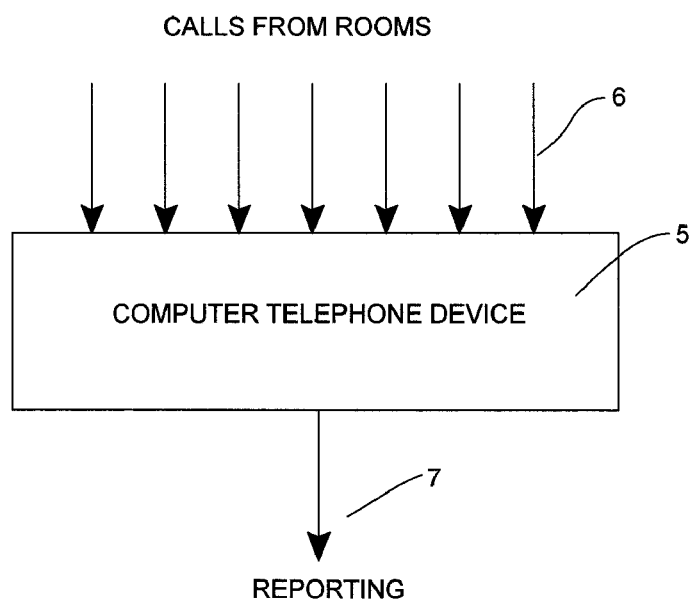
FIG. 2 is a simplified block diagram of the present invention.

The present invention requires a telephone system that can receive numerous telephone calls in a very short time window without blocking calls (ringing busy). For example, a school with 200 classrooms would require a system that could handle at least 200 simultaneous calls or more. FIG. 2 shows a block diagram of a computer telephone device or system 5 that receives many near-simultaneous calls 6 from victims in a crisis. The system 5 asks a series of automatic questions, compiles the information, and reports it 7. The reporting can be continuous, or it can be updated as new calls come in. The reporting can also be based on a collection cycle, say every 30 seconds or 1 minute. The preferred way is to update the information available to the responders as it comes in. At the beginning of a crisis, there will be numerous calls, and the reporting will be almost continuous. Further into the crisis, after most rooms have reported, the number of new calls will drop off and dwindle to a few straggler calls coming in. At this points, the reports can be made only when a new call comes in.

Figure 3:
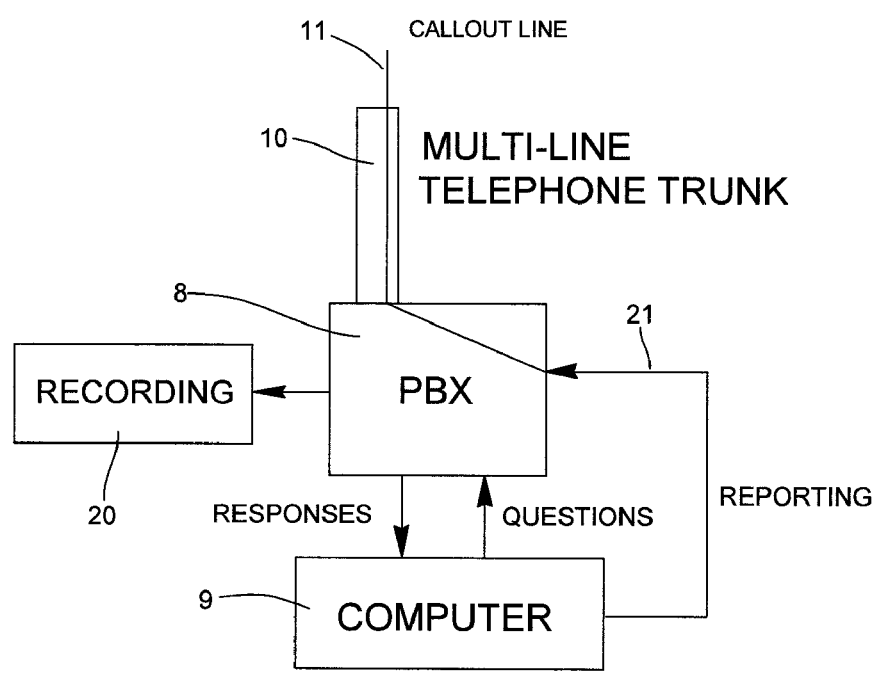
FIG. 3 is a block diagram of the telephone PBX aspect of the present invention.

FIG. 3 shows an embodiment of the telephone aspect of the present invention. A PBX 8, or other telephone equipment is attached to a multi-line trunk 10 supplied by a telephone service provider. This can be supplied as separate telephone lines, but is more likely supplied by fiber optic cable or a group of T1 lines or equivalent. The telephone central office, or equivalent provider, allocates a large number of channels to calls coming from a designated number. For example, a 1-800 or similar number can be reserved for the service from a particular location. In other words, a certain high school or subscribing office building or hotel would reserve a certain number of channels on a particular telephone number. This type of technology is currently in use as previously stated for sales situations such as infomercials. A particular telephone product that can supply the needs of the present invention is the Pacer IVR System manufactured by Database Systems Corp. of Phoenix Ariz.

A computer 9 is alerted to each new incoming call, and provides a predetermined or interactive menu of recorded questions. The response to each question is received from the phone's keypad, or by voice recognition software known in the art or both. The preferred method is to use both voice recognition and keypad since, in an emergency situation, voice may be easier and faster; however, voices may be excited and loud with a lot of possible background noise, or they might be very soft such as a whisper. A recorded prompt could tell the caller to answer by entering 1, 2 or some other number on the phone's keypad. A simplified embodiment of the present invention uses only keypad entry.

Calls on all incoming telephone channels are preferably recorded, in addition to being processed, using multi-track, high-quality sound recording equipment 20 as shown in FIG. 3. While this is optional, it is very useful for post-event recreation and also can be useful in real time if there are spoken words or sounds of gunshots, etc. Whether recordings are analog or digital, they are evidentiary and provide a valuable collection of factual information for a post-incident recreation of events and/or prosecution of the violators.

FIG. 3 also shows a reporting channel 21 used to update responders with the information gathered. This channel runs into one or more outgoing telephone channels 11 in the trunk 10. It can also be a digital interface into the Internet either wired or wireless. Reported information can be sent back on a dedicated telephone channel, or by any means including an Internet website, any type of network, WiFi or by direct cellular voice or data or Internet accessed by cellular or WiFi. Any method of reporting and communicating gathered data is within the scope of the present invention. In particular, a security protected website is a very convenient method of presenting the data. This way, it is immediately and simultaneously available to all authorized individuals regardless where they may be since a website can be accessed from any computer, laptop or even cellular telephones with browsers. The preferred method for a website is to have the highest level of security due to the nature of the data. Encrypted transmission, known in the art, is highly recommended. Access can be by combination of digital certificate and password. Any such website may have one or more secure servers, network interfaces and other computing and communication modules or devices. Such a site can be duplicated for security and reliability. A pair of duplicate control sites could simultaneously process the incoming information with one generally acting as a master site or server, with the other as a slave site or backup.

FIG. 4 shows a set of recorded questions that can be asked a caller. The telephone/computer system can automatically date/time stamp each received message as well as store each incoming caller ID. The basic questions can be: room number, how many people in the room, how many injuries, any fatalities, knowledge of offenders or offenders' whereabouts, and an estimated danger level on a scale of say 1-10. In another embodiment of the present invention, the questions can be made somewhat interactive. For example, an excited caller might not be able to remember the room number, or the room may have a more familiar name like "cafeteria". If the system uses voice recognition, there can be a pre-stored list of room names/numbers. For example, if the caller can't remember the room number, the computer could ask for the name of the room or what class, etc. An answer might be "the chemistry lab" or "Mr. Paulson's class" or "Sam Jone's office". While it is normally impossible to anticipate every possible answer, many of the answers can be correlated with good voice recognition software and a database (which is kept up to date) of alternate names for rooms.

It is very important to keep the call moving, so if the caller cannot for some reason answer a particular item, the system should move on to the next. All systems should have the basic capability to take answers directly from a keypad. For example, the caller might be in the room where an armed perpetrator is holding hostages say on the floor, or under a table or in a closet. The system should make every attempt to make the information gathering process simple and safe. For example, the first question might be: "Enter or say the room number you are calling from. If you don't know, enter the pound sign". If the person speaks, and voice recognition is working, the rest of the conversation can be speeded up by staying with voice as long as it is being understood while resorting to keypad if not understood. For example: Q. "Are there any fatalities in the room." A confused answer might come back: A. "I don't know—like there's blood everywhere. People are hurt—I don't know." The system could then re-ask: Q. "Enter 1 on the keypad if you know somebody is dead, otherwise enter zero." Finally, as shown in FIG. 4, the system could ask for a social security number, the last four digits, or some other ID that could be used to verify that the call is valid.

To distinguish between possible emergencies, the first question could be is this a fire?, armed attack?, other emergency?, depending on the intermediate answer. For "other emergency", a live operator can be put on the call if necessary to determine what is happening. It makes no sense to run questions designed for an armed attack in a fire or other emergency.

The questions for a fire could follow a similar line: 1) where are you?, 2) do you know where the fire is?, 3) is anyone near you hurt?, 4) ID of the caller.

Also, sometimes a caller has more information and makes a second or subsequent call to the emergency number. The system can sense this by calling telephone number and present different questions or immediately connect with a live operator. As with first calls, live audio recordings in parallel with information processing are preferred.

FIG. 5 shows a spreadsheet presentation of gathered data for an armed attack. This display could be made by hand from raw data; it could be created by the computer and printed out, or it could appear on a screen, either on a dedicated computer or from a secure website. The sheet contains the date mainly for archive purposes since this is not very important to responders. The rows can be arranged chronologically as calls come in or rearranged by location as shown in FIG. 5. Here, the sheet is organized by room numbers. There is a time that each call came in and the calling telephone number. In addition, the number of injured, whether there are fatalities, and an estimated danger level are shown. Finally, there is a column entitled "Knowledge of Offenders". This should mean whether anyone in that room has any knowledge of where the offenders are and/or what they are doing. Responders can use the call-back numbers to directly talk to the callers if more information is required (such as what knowledge of the offenders).

Figure 6:
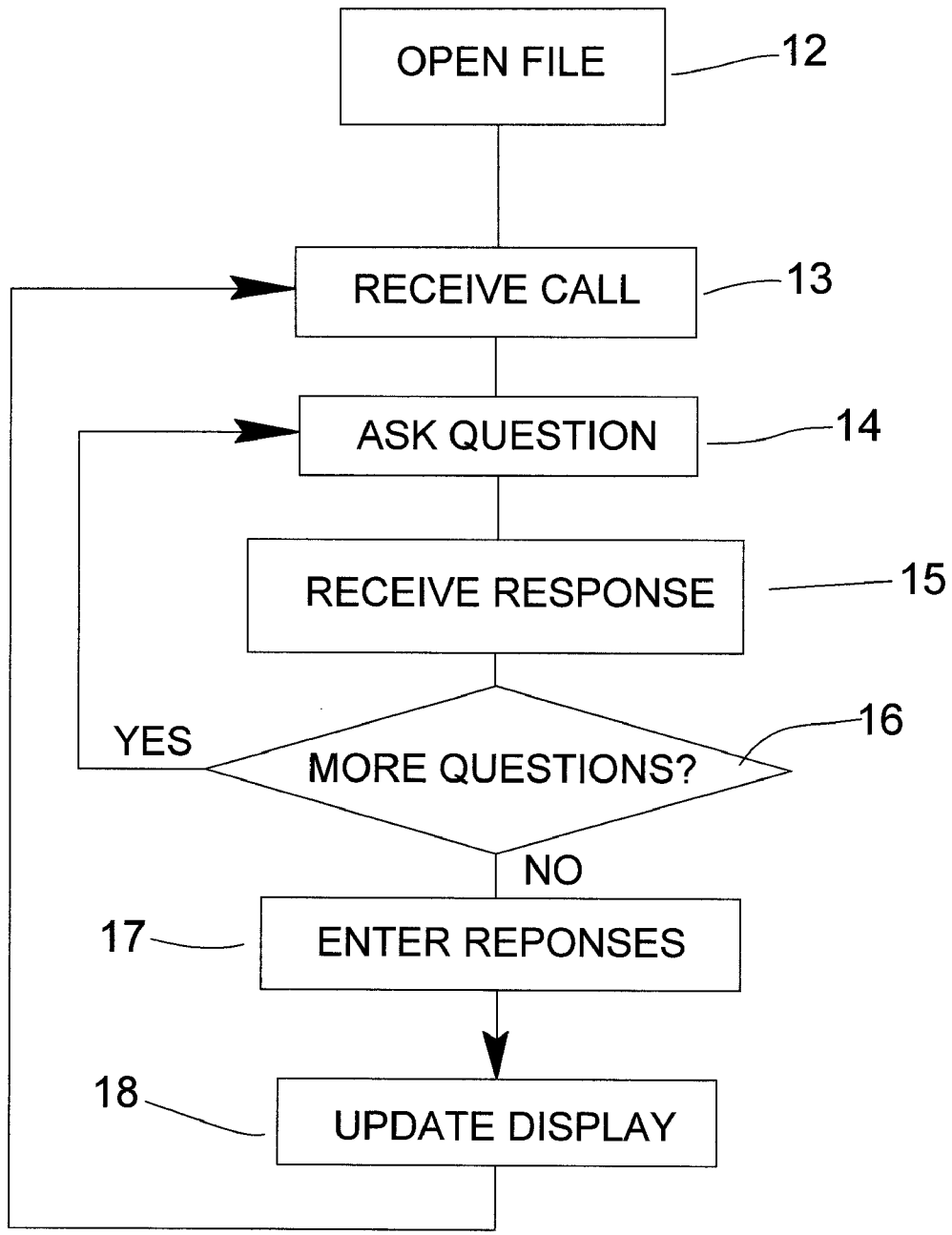
FIG. 6 is a flow chart of a simple questioning process.
Figure 7:
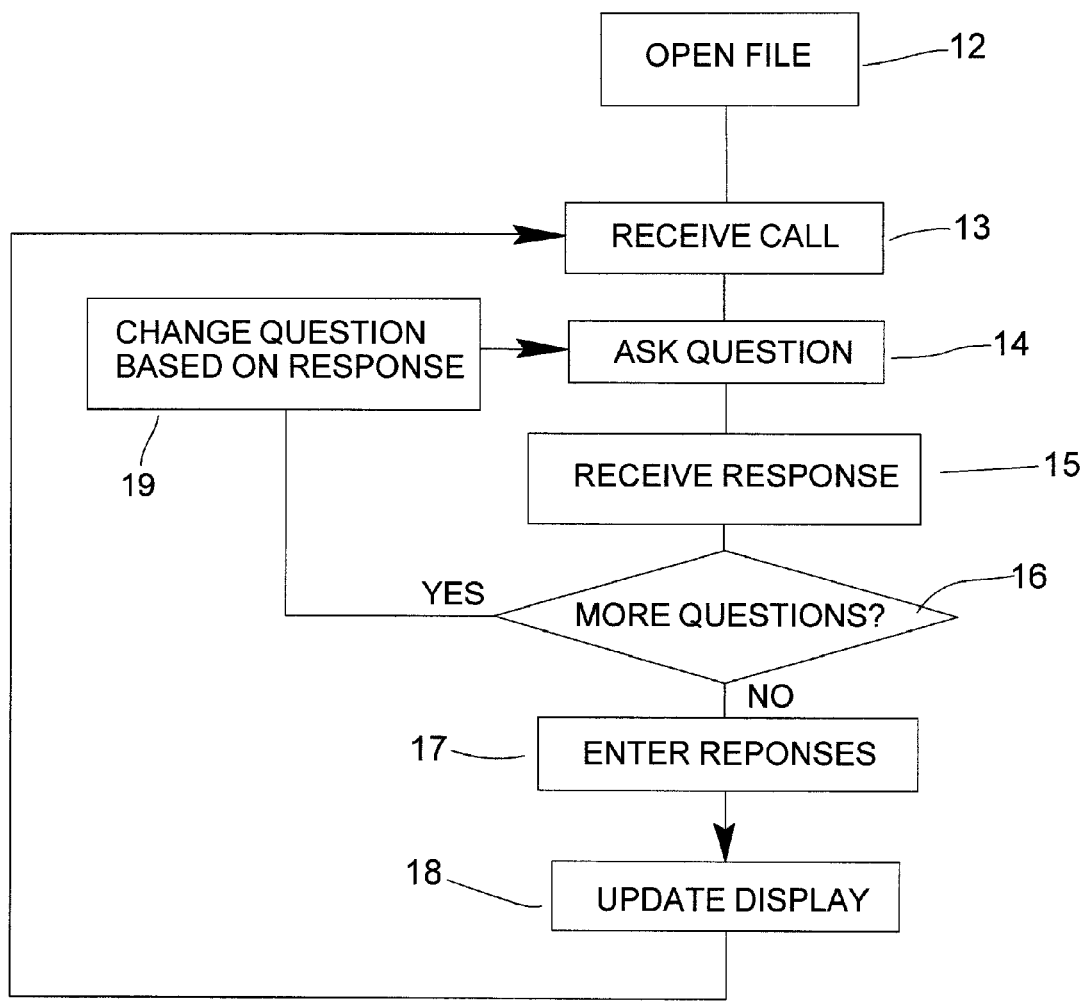
FIG. 7 shows a flowchart of an interactive questioning process.

FIGS. 6-7 are flowcharts of the questioning process. FIG. 6 shows a static process, while FIG. 7 shows an interactive or dynamic process. In FIG. 6, the event opens 12 with the first incoming call. The call is received 13, and a data entry is started for that call including a date/time stamp and the caller ID. The program then loops on asking a fixed series of questions 14 and receiving the response to each one 15 one by one. At each step in the loop, the program decides 16 if more questions remain on the menu. If so, the next question is asked 14; if not, the entire set of responses is entered into a data record 17 in a database or storage area. The summary of that call is then forwarded to responders who need the data, either by way of a display update, webpage update or by telephone. FIG. 7 shows essentially the same process as FIG. 6 except that each new question may possibly be changed 19 or based upon previous answers. In particular, if the incoming call for some reason does not have caller ID, a question can be added to the menu to receive the calling number. Other interactive scenarios are also possible such as asking "how many", if a caller reports fatalities or asking about hostages or if a perpetrator is present in the room.

Some embodiments of the present invention can present a pre-stored map of the facility with response information such as the number of people in a room, number of injuries, etc. superimposed. This map with data superimposed can be displayed on the secure website, or sent directly to a responder's laptop computer or cellphone. In some embodiments of the invention, the computer can attempt to display regions on the map where the perpetrator(s) might be, generally with a warning that this is simply an estimate. In one mode, the display might show known details about the perpetrator's path as a function of time as diagramed in FIG. 1. Again, this would just be an estimate and would depend on how much detail was discovered through the questioning process. As previously stated, this presentation data can be made available to authorized personnel on a secure website.

Responders such as police, fire, FBI, SWAT teams, etc. would normally review the intelligence report produced by the present invention and: 1) Attempt to identify the area of the scene where hostiles (or a fire, etc.) are located in order to determine an immediate response. For example in an attack, if all hostiles were in a part of the building that could be isolated, then an initial response plan could be developed to isolate that area and evacuate others, including injured, from the crisis scene. 2) Use telephone numbers presented on the report to update information by calling contact numbers if necessary, particularly in the most affected rooms, i.e. those rooms with fatalities/injuries or who have knowledge of the offenders, fire, etc. 3) Use lack of call from rooms to assume possible hostile control in developing a plan of response. 4) Use collected contact numbers to direct victims. 5) Possibly use contact numbers to develop contact with one or more hostiles (hostile possibly having taken over a particular room after an initial call to the system). 6) Use of all information gathered or being gathered by the present invention to develop and modify plans, gather additional intelligence and expedite victim rescue and hostile neutralization or fire mitigation and rescue.

The system and method of the present invention can be used in two basically different ways: 1) the present invention can be used to quickly gather initial information from any locations that call in; present that information to responders, and essentially remain quiescent after that, or 2) the present invention can be used in a mode where it is active throughout the entire crisis continually updating information as calls come in or data is passed in on to victims. The second mode is the preferred one.

Figure 8:
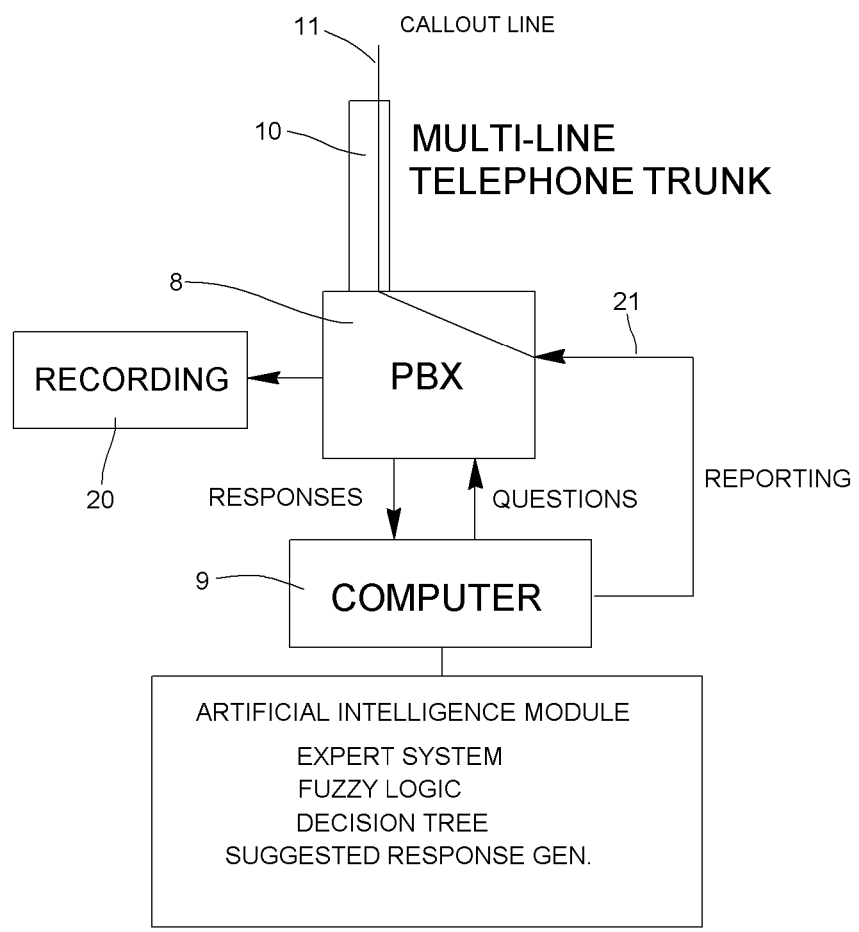
FIG. 8 shows an embodiment of the invention with artificial intelligence.

Several artificial intelligence techniques and algorithms can also be used to generate and respond to questions including expert systems, fuzzy logic, neural networks and any other type of intelligent computing or processing. In an advanced embodiment of the present invention, suggested responses can also be generated by the processing system and presented to authorized responders or commanders. FIG. 8 shows a system using several artificial intelligence algorithms or techniques.

It should also be noted that some locations such as high-rise buildings have multiple floors. In this case, tactical display data can be provided on a floor-by-floor basis, with or without maps, as needed. Spreadsheet data can optionally span multiple floors preferably using room numbers or some other convenient identifier to show floor.

This system can be optionally used to compile additional information or intelligence gathered during the entire crisis. An embodiment of the present invention could automatically allow the inclusion of additional information and could automatically create a record of all intelligence gained during the crisis.

Several descriptions and illustrations have been given to aid in understanding the present invention. One of skill in the art will realize that there are numerous changes and variations possible without departing from the spirit of the invention. Each of these changes and variations is within the scope of the present invention.

I claim:

1. A method of rapidly gathering information at a crisis scene comprising:

providing to a particular site a predetermined emergency telephone number unique to said particular site coupled to a computer-controlled interactive voice response system for use in emergency situations by anyone at said particular site, said interactive voice response system executing on a computer or server connected to a telephone receiving module adapted to simultaneously receive a large number of calls made to said emergency telephone number;

allowing a plurality of simultaneous or near-simultaneous incoming calls to said predetermined emergency telephone number to access said interactive voice response system using the telephone module;

automatically presenting a set of predetermined questions to each caller of said telephone number, said questions being stored in a memory device coupled to said computer or server, said questions being provided to said telephone module by said computer or server;

automatically gathering responses to said questions by said computer or server and storing said responses in a memory device;

automatically processing the responses on one or more computers to generate data presentation for responders at said particular site representing site-specific and crisis specific details;

presenting said data presentation to authorized parties.

2. The method of claim 1 wherein said data presentation is made available over a network.

3. The method of claim 1 wherein said data presentation is communicated at least partially by wireless.

4. The method of claim 1 wherein said predetermined emergency telephone number is posted in rooms at said particular location.

5. The method of claim 1 wherein said telephone module is a parallel PBX.

6. The method of claim 1 wherein said site is a school.

7. The method of claim 6 wherein said predetermined site is a school.

8. The method of claim 1 wherein said responses are processed by an artificial intelligence algorithm to produce said data presentation.

9. The method of claim 1 further comprising presented suggested responses based on said responses to authorized personnel.

10. The method of claim 1 further comprising a second, backup secure computer or server.

11. The method of claim 1 further comprising training a set of pre-designated persons at said particular site to call said emergency telephone number in emergency and respond to said set of predetermined questions.

12. A method of providing tactical information to responders at an armed attack emergency scene comprising:

providing to a particular location a predetermined emergency telephone number different from a standard emergency number coupled to an interactive voice response system for use in emergency situations by anyone at said particular location, said interactive voice response system executing on a server electrically connected with a telephone receiving module;

allowing a plurality of simultaneous or near-simultaneous incoming calls to said predetermined emergency telephone number to access said interactive voice response system using the telephone receiving module; the telephone receiving module being adapted to handle a large incoming call volume on a single telephone number coming from a particular geographic location;

automatically presenting a set of predetermined questions to each caller of said telephone number, said predetermined questions including location of the caller, knowledge of location of hostiles and number of hurt or dead in room, said predetermined questions stored in a memory device electrically connected to said server;

automatically receiving responses to each question via said interactive voice response system and storing said responses in said memory system;

automatically processing said responses on the server to generate tactical display data, said tactical display data containing spread sheet or graphic elements specific to said particular geographic location and said emergency;

presenting said tactical display data to responders via local or remote displays.

13. The method of claim 12 wherein said tactical display data includes a room map of said particular location.

14. The method of claim 13 wherein said tactical display data displays room maps based on floor.

15. The method of claim 12 wherein said step of automatically processing uses an artificial intelligence algorithm.

16. A system for rapidly gathering information at a crisis scene occurring at a particular location comprising:

a telephone call receiving module adapted to receive and process a plurality of calls simultaneously based on a dedicated telephone number different from 911, 999, 888 or other standard emergency number, said dedicated telephone number available to anyone at said particular location, wherein said dedicated telephone number is posted in rooms at said particular location;

at least one computer coupled to said telephone call receiving module, said computer executing a program stored in memory presenting a set of predetermined questions presented sequentially to each caller of said predetermined telephone number, said questions particularly chosen to present crisis data relating to said particular location;

a collection module also executing in a computer coupled to said telephone call receiving module collecting a response for each of said predetermined questions;

a processing module in a computer in communication with said collection module reducing and organizing said responses to generate presentation data specific to said particular location and the particular crisis, said presentation data containing spread sheet or graphical information;

a communications module in a computer in communication with said processing module adapted to communicate said presentation data to responders.

17. The system of claim 16 wherein at least one of said computers is a server coupled to the Internet.

18. The system of claim 16 wherein said presentation includes at least one map of a site.

19. The system of claim 16 wherein said predetermined questions include location of a caller and situation conditions near said caller.

20. The system of claim 16 wherein said communications module is data-coupled into a wireless network.

* * * * *